United States Patent Office
3,833,580
Patented Sept. 3, 1974

3,833,580
3-MORPHOLINO-N⁶-CYCLOHEXYLCARBONYL SYDNONIMINE
Manfred Gotz, Hudson, Quebec, Canada, Karl Zeile, Ingelheim am Rhein, Germany, Kurt Freter, Beaconsfield, Quebec, Canada, and Gisela Wehlmann, Wiesbaden-Sonnenberg, Germany, assignors to Boehringer Ingelheim G.m.b.H., Ingelheim am Rhein, Germany
No Drawing. Continuation-in-part of applications Ser. No. 658,610, Aug. 7, 1967, and Ser. No. 809,392, Mar. 21, 1969, both now abandoned. This application Aug. 18, 1970, Ser. No. 64,817
Claims priority, application Germany, Aug. 9, 1966, B 88,408; Mar. 26, 1968, P 17 70 061.7; Aug. 22, 1969, P 19 42 854.7
Int. Cl. C07d 87/40
U.S. Cl. 260—247.2 A                1 Claim

ABSTRACT OF THE DISCLOSURE

Compounds of the formula

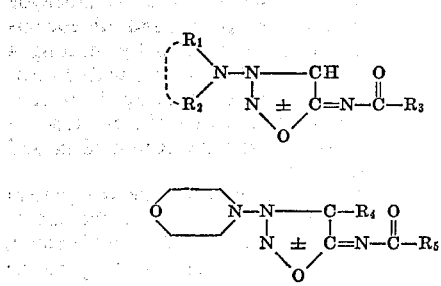

and

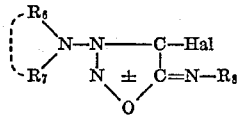

wherein $R_1$ is methyl, allyl or phenyl-lower alkyl,
$R_2$ is methyl or allyl,
$R_1$ and $R_2$, together with each other and the nitrogen atoms to which they are attached, are piperidino, hexamethyleneimino or tetrahydroisoquinolino,
$R_3$ is methyl, cyclohexyl, lower alkoxy, phenyl, phenoxy, pyridyl or 5-nitro-furyl,
$R_4$ is hydrogen, chlorine, bromine or iodine,
$R_5$ is cyclohexyl or lower alkoxy,
$R_6$ and $R_7$ are each methyl or, together with each other and the nitrogen atom to which they are attached, piperidino, N'-methyl-piperazino or, when $R_8$ is hydrogen, morpholino,
$R_8$ is hydrogen, acetyl, cyclohexylcarbonyl, lower alkoxycarbonyl or phenoxycarbonyl, and
Hal is chlorine, bromine or iodine, and their non-toxic, pharmacologically acceptable acid addition salts; the compounds as well as the salts are useful as hypotensives in warm-blooded animals.

This is a continuation-in-part of copending applications Ser. No. 658,610, filed Aug. 7, 1967; and Ser. No. 809,392, filed Mar. 21, 1969, both now abandoned.

This invention relates to novel 3-amino-sydnonimines and non-toxic acid addition salts thereof, as well as to various methods of preparing these compounds.

More particularly, the present invention relates to 3-amino-sydnonimines of the formula selected from the group consisting of

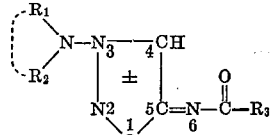

(I)

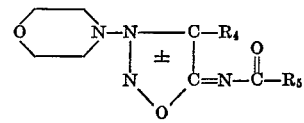

(II)

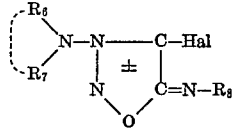

(III)

wherein $R_1$ is methyl, allyl or phenyl-lower alkyl,
$R_2$ is methyl or allyl,
$R_1$ and $R_2$, together with each other and the nitrogen atom to which they are attached, are piperidino, hexamethyleneimino or tetrahydroisoquinolino,
$R_3$ is methyl, cyclohexyl, lower alkoxy, phenyl, phenoxy, pyridyl or 5-nitro-furyl,
$R_4$ is hydrogen, chlorine, bromine or iodine,
$R_5$ is cyclohexyl or lower alkoxy,
$R_6$ and $R_7$ are each methyl or, together with each other and the nitrogen atom to which they are attached, piperidino, N'-methyl-piperazino or, when $R_8$ is hydrogen, morpholino,
$R_8$ is hydrogen, acetyl, cyclohexylcarbonyl, lower alkoxycarbonyl or phenoxycarbonyl, and
Hal is chlorine, bromine or iodine, and non-toxic, pharmacologically acceptable acid addition salts thereof.

The compounds of the formulas I and those of the formula II wherein $R_4$ is hydrogen may be prepared by subjecting a compound of the formula

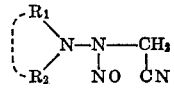

(IV)

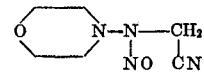

(V)

wherein $R_1$ and $R_2$ have the same meanings as in formula I, to a ring closure reaction with a conventional cyclizing agent of the strong inorganic or organic acid type, such as a hydrohalic acid, a carboxylic acid anhydride, a Lewis acid such as zinc chloride, a cyanic acid ester or the like, to form the corresponding N⁶-unsubstituted 3-amino-sydnonimine, and subsequently acylating the latter at the N⁶-position pursuant to conventional methods.

The cyclization reaction may be carried out in the presence or absence of a solvent. Examples of especially suitable solvents are methanol, ethanol, acetone, chloroform, tetrahydrofuran and water. The reaction may be performed at moderately elevated temperature, at room temperature or also at moderately cold temperatures The subsequent acylation at the N⁶-position is effected by treating the said N⁶-substituted 3-amino-sydnonimine with a conventional acid halide or acid anhydride acylating agent, such as acetic acid anhydride, benzoyl chloride or nicotinoyl chloride, or with a haloformic acid ester, such as methyl or ethyl chloroformate. The acylation reaction is preferably carried out in the presence of an inorganic or organic base as an acid acceptor, such as pyridine or an alkali metal carbonate or acetate, and in the presence of a solvent, if necessary.

The compounds of the formula II wherein $R_4$ is bromine, chlorine or iodine and the compounds of the formula III are prepared by halogenating a sydnonimine of the formula

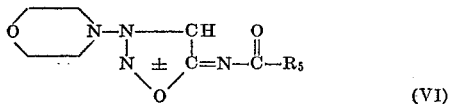

(VI)

or

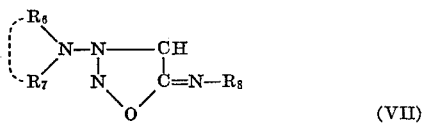

(VII)

wherein $R_5$, $R_6$ and $R_7$ have the same meanings as in formulas II and III and $R_8$ has the meanings defined in connection with formula III except hydrogen, or an acid addition salt thereof, with a conventional halogenating agent, such as elemental bromine, N-chloro-succinimide, N-bromo-succinimide, N-iodo-succinimide or the like, in the presence of a solvent, such as methylene chloride, chloroform, carbon tetrachloride, ether or water. If elemental bromine is used as the halogenation agent, it is advantageous to add a solution or suspension of a weakly basic salt, such as sodium bicarbonate or sodium acetate, to the reaction mixture.

The halogenation may be carried out at moderately elevated temperatures, at room temperature or also at moderately cold temperatures, with the starting compound in solution or suspension. The halogenation with an N-halo-succinimide requires in most instances the addition of dibenzoyl peroxide or azoisobutyronitrile and sometimes elevated temperatures.

The $N^6$-acyl-3-amino-4-halo-sydnonimine reaction products may, if desired, also be de-acylated in conventional fashion to form the corresponding $N^6$-unsubstituted 3-amino-4-halo-sydnonimines, for example by treatment with a dilute mineral acid, such as a hydrohalic acid, sulfuric acid, nitric acid or phosphoric acid.

The free sydnonimines of the formulas I, II and III above are relatively unstable and are therefore preferably isolated in the form of their addition salts with an inorganic or organic acid. Examples of non-toxic, pharmacologically acceptable acid addition salts are those formed with a hydrohalic acid, sulfuric acid, nitric acid, phosphoric acid, perchloric acid, formic acid, acetic acid, propionic acid, oxalic acid, succinic acid, tartaric acid, citric acid, maleic acid, ascorbic acid, salicylic acid, methanesulfonic acid, p-toluenesulfonic acid, 8-chloro-theophylline or the like.

Especially preferred compounds of the present invention are those of the formula II wherein $R_4$ is hydrogen, chlorine or bromine and $R_5$ is cyclohexyl or lower alkoxy, and those of the formula III wherein $R_6$ and $R_7$, together with each other and the nitrogen atom to which they are attached, are morpholino, $R_8$ is hydrogen and Hal is chlorine or bromine, and their non-toxic, pharmacologically acceptable acid addition salts.

Thus, the following specific 3-amino-sydnonimines and their non-toxic acid addition salts may be obtained by the above described procedures:

3-Dimethylamino-$N^6$-ethoxycarbonyl-sydnonimine;
3-Dimethylamino-$N^6$-(5'-nitro-furoyl)-sydnonimine;
3-Dimethylamino-$N^6$-acetyl-sydnonimine;
3-Dimethylamino-$N^6$-benzoyl-sydnonimine;
3-Dimethylamino-$N^6$-cyclohexylcarbonyl-sydnonimine;
3-Dimethylamino-$N^6$-nicotinoyl-sydnonimine;
3-Diallylamino-$N^6$-acetyl-sydnonimine;
3-[N'-Methyl-N'-($\alpha$-methyl-benzyl)-amino]-$N^6$-nicotinoyl-sydnonimine;
3-Hexamethyleneimino-$N^6$-benzoyl-sydnonimine;
3-Piperidino-$N^6$-acetyl-sydnonimine;
3-Piperidino-$N^6$-ethoxycarbonyl-sydnonimine;
3-Morpholino-$N^6$-cyclohexylcarbonyl-sydnonimine;
3-(N'-Methyl-piperazino)-4-bromo-$N^6$-phenoxycarbonyl-sydnonimine;
3-Piperidino-4-bromo-sydnonimine;
3-Morpholino-4-bromo-$N^6$-cyclohexylcarbonyl-sydnonimine;
3-Morpholino-4-chloro-$N^6$-cyclohexylcarbonyl-sydnonimine;
3-Morpholino-4-iodo-$N^6$-cyclohexylcarbonyl-sydnonimine;
3-Morpholino-4-bromo-$N^6$-ethoxycarbonyl-sydnonimine;
3-Morpholino-4-bromo-sydnonimine;
3-Dimethylamino-4-bromo-sydnonimine;
3-(1',2',3',4'-Tetrahydro-isoquinolino)-$N^6$-acetyl-sydnonimine; and
3-(N'-Methyl-piperazino)-$N^6$-phenoxycarbonyl-sydnonimine.

The starting compounds of the formulas IV and V may be prepared by known methods, such as by reacting a correspondingly disubstituted hydrazine salt with an alkali metal cyamide and a correspondingly substituted aldehyde or aldehyde hydrogen bisulfite compound, and subsequently introducing the nitroso group; or also by reacting a correspondingly disubstituted hydrazine salt with hydrocyanic acid and an aldehyde, and introducing the nitroso group; or, finally, also by direct reaction of a correspondingly disubstituted hydrazine salt with cyanohydrin and subsequent treatment with a nitrite.

The following examples further illustrate the present invention and will enable others skilled in the art to understand it more completely. It should be understood, however, that the invention is not limited solely to the particular examples given below.

EXAMPLE 1

Step A: Preparation of 3-piperidino-sydnonimine·HCl 80 cc. of concentrated hydrochloric acid were slowly added, while stirring, to a mixture of 95 gm. (.095 mol) of N-amino-piperidine and 100 cc. of water while maintaining a temperature of 10° C., the pH being nearly neutral. The mixture was cooled to 5° C. in an ice bath, and a solution of 61.5 gm. (0.95 mol) of potassium cyanide in 130 cc. of water was added over a period of 30 minutes. The temperature was kept at 10° C. and, over a period of another 30 minutes, 71.5 cc. (0.95 mol) of 40% formaldehyde solution were added. The mixture was stirred for one hour, brought to room temperature and stirred for another hour. Then it was cooled again to 5° C. and slowly admixed with 40 cc. of concentrated hydrochloric acid and then with a solution of 69 gm. (1 mol) of sodium nitrite in 140 cc. of water. The pH of the solution was kept within an acid range by gradually adding 40 cc. of concentrated hydrochloric acid.

The nitroso derivative thus formed was extracted with chloroform to obtain a crude yield of 160 gm. The crude product was gradually added, while stirring and cooling to 1 liter of methanolic hydrochloric acid. The resulting solution was evaporated in vacuo at 30° C., and the residue was chromatographed with silicic acid and elution with chloroform containing 20% of methanol to obtain 106.2 gm. (53% of theoryl) of 3-piperidino-sydnonimine hydrochloride. After recrystallization from methanol/ether, the compound had a melting point of 162–163° C. (decomposition).

Step B: Preparation of 3-piperidino-$N^6$-acetyl-sydnonimine·HCl 2.5 gm. (0.0125 mol) of 3-piperidino-sydnonimine hydrochloride were added to a solution of 25 cc. of acetic acid anhydride in 5 cc. of pyridine. The mixture was heated to 30° C. until it dissolved completely, and it was then allowed to stand at room temperature for three hours and at 5° C. for two days. The crystals that separated after this time were filtered off. The mother liquor was evaporated to dryness and the remaining resin was crystallized from methanol/ether. The two crystalline fractions were identical, and the total yield was 1.96 gm. (33% based on hydrochloride) of 3-piperidino-N⁶-acetyl-sydnonimine hydrochloride, m.p. 175° C. (decomp.), of the formula

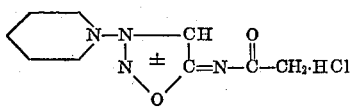

EXAMPLE 2

Step A: Preparation of 3-dimethylamino-sydnonimine·HCl

Using the procedure of Step A of Example 1, 51% of the theoretical yield of 3-dimethylamino-sydnonimine hydrochloride, having a melting point of 173–174° C. (decomposition), was obtained from N,N-dimethyl-hydrazine.

Step B: Preparation of 3-dimethylamino-N⁶-ethoxycarbonyl-sydnonimine·HCl

A mixture of 16.5 gm. (0.1 mol) of 3-dimethylamino-sydnonimine hydrochloride and 200 cc. of pyridine was cooled to −10° C. and admixed dropwise with 16.5 gm. (0.10 mol) of ethyl chloroformate. The temperature was allowed to rise first to 5° C. and then to room temperature, and the mixture was stirred for three hours at room temperature. 500 cc. of water were added and the solution was extracted with chloroform. The chloroform extracts were dried over sodium sulfate and evaporated to dryness in vacuo. The residue was taken up in isopropanol/ether, the solution was allowed to stand at −10° C., and the separated crystals were vacuum-filtered off to obtain 16 gm. (34% of theory) of 3-dimethylamino-N⁶-ethoxycarbonyl-sydnonimine hydrochloride, having a melting point of 155° C. (decomp.), of the formula

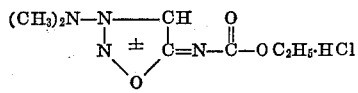

EXAMPLE 3

Preparation of 3-dimethylamino-N⁶-(5′-nitro-furoyl)-sydnonimine 12 gm. (0.07 mol) of 3-dimethylamino-sydnonimine hydrochloride produced in Step A of Example 2 and 17.5 gm. (0.1 mol) of 5-nitro-furoyl chloride were added to 150 cc. of pyridine. The mixture was allowed to stand for three and one-half hours at room temperature and then overnight at 0° C. Then, the excess acid chloride was destroyed by the addition of 25 cc. of water; and the solution was distributed between 100 cc. of water; and 200 cc. of chloroform. The two phases were separated, and the aqueous phase was extracted four times with 150 cc. of chloroform each. The combined chloroform extract solutions were dried, and the solvent was distilled off in vacuo. The remaining resin was crystallized from acetonitrile/ether to obtain 12.2 gm. (43% of theory) of 3-dimethylamino-N⁶-(5′ - nitro - furoyl)-sydnonimine, having a melting point of 218–219° C. (decomp.) after crystallization from acetonitrile/ether, of the formula

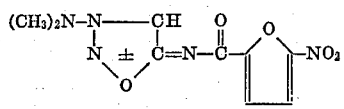

EXAMPLE 4

Step A: Preparation of 3-diallylamino-sydnonimine·HCl 45 cc. of concentrated hydrochloric acid were added slowly, while stirring, at 10° C. to a suspension of 72 gm. (0.64 mol) of N,N-diallyl-hydrazine in 150 cc. of water. The mixture was cooled to 5° C. on an ice bath and admixed over a period of 30 minutes with a solution of 3 gm. (0.64 mol) of potassium cyanide in 90 cc. of water. The temperature was kept at 5° C. and, over a period of an hour, 50 cc. of 40% formaldehyde solution (0.65 mol) were added thereto. The mixture was stirred for 1 hour while cooling, brought to room temperature and stirred for another hour. Then the mixture was again cooled to 5° C. and admixed over a period of 30 minutes with 50 ml. of 1N hoydrochloric acid. Then, a solution of 48 gm. of sodium nitrite (0.07 mol) in 100 cc. of water was added, and the pH was kept low by gradual addition of 150 cc. of 4N hydrochloric acid. The mixture was stirred at 5° to 10° C. for one hour, brought to room temperature and extracted three times with chloroform. The chloroform extracts were dried over sodium sulfate, filtered and evaporated to dryness in vacuo to obtain 122 gm. of crude product, which was dissolved in 180 cc. of methanol, and the resulting solution was added slowly to 2 liters of methanolic hydrochloric acid. The resulting solution was concentrated in vacuo at 30° C. and chromatographed over silicic acid with elution with chloroform containing 10% of methanol to obtain 78 gm. (56% of theory) of 3-diallylamino-sydnonimine hydrochloride which, after recrystallization from methanol/ether, had a melting point of 94–96° C. (decomposition).

Step B: Preparation of 3-diallylamino-N⁶-acetyl-sydnonimine·HCl

Using the procedure of Step B of Example 1, 36% of the theoretical yield of 3-diallylamino-N⁶-acetyl-sydnonimine hydrochloride, having a melting point of 108–109° C. (decomposition), of the formula

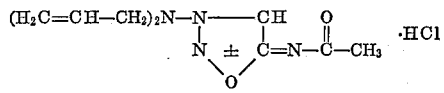

was obtained from 3-diallylamino-sydnonimine hydrochloride and acetic acid anhydride.

EXAMPLE 5

Step A: Preparation of 3-hexamethyleneimino-sydnonimine·HCl 90 cc. of concentrated hydrochloric acid were added slowly at 10° C., while stirring, to 114 gm. (1 mol) of N-amino-hexamethyleneimine and 120 cc. of water. The mixture was cooled on an ice bath to 5° C. and was admixed over a period of 30 minutes with a solution of 66 gm. (1 mol) of potassium cyanide in 150 cc. of water. Over a period of another 30 minutes, 75 cc. of a 40% formaldehyde solution (1 mol) were added thereto, and the mixture was stirred for one hour, then brought to room temperature and stirred for another hour. After cooling the mixture again to 5° C., 45 cc. of concentrated hydrochloric acid and then a solution of 69 gm. (1 mol) of sodium nitrite in 140 cc. of water were added slowly thereto. The pH of the solution was kept in the acid range by adding gradually 45 cc. of concentrated hydrochloric acid.

The nitroso derivative thus formed was extracted with chloroform, and the 172 gm. of crude product obtained were gradually added to 1 liter of methanolic hydrochloric acid, while stirring and cooling. The resulting solution was concentrated in vacuo at 30° C. and chromatographed with silicic acid and elution with chloroform containing 10% of methanol to obtain 3-hexamethyleneimino-sydnonimine hydrochloride with a yield of 113.8 gm. (52%, of theory). After recrystallization from methanol/ether, the melting point of the product was 153–154° C. (decomposition).

Step B: Preparation of 3-hexamethyleneimino-N⁶-benzoyl-sydnonimine·HCl

Using the procedure of Step B of Example 1, 32% of the theoretical yield of 3-hexamethyleneimino-N⁶-benzoyl-sydnonimine hydrochloride, having a melting point of 149–150° C. (decomposition), of the formula

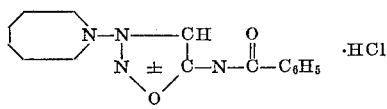

was obtained from 3-hexamethyleneimino-sydnonimine hydrochloride and benzoyl chloride.

EXAMPLE 6

Step A: Preparation of 3-[N-methyl-N-(α-methyl-benzyl)-amino]-sydnonimine·HCl

Using the procedure of Step A of Example 1, 62% of the theoretical yield of 3-[N-methyl-N-(α-methyl-benzyl)-amino]-sydnonimine hydrochloride, having a melting point of 171° C. (decomposition), was obtained from N-methyl-N-(α-methyl-benzyl)-hydrazine, potassium cyanide and sodium nitrite.

Step B: Preparation of 3-[N-methyl-N-(α-methyl-benzyl)-amino]-N-nicotinoyl-sydnonimine·HCl Using the procedure of Step B of Example 1, 45% of the theoretical yield of 3-[N-methyl-N-(α-methyl-benzyl)-amino]-N⁶-nicotinoyl-sydnonimine hydrochloride, having a melting point of 176° C. (decomposition), of the formula

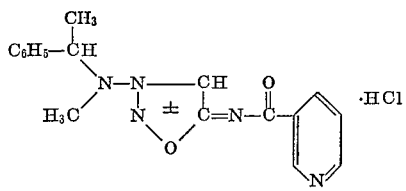

was obtained from 3-[N-methyl-N-(α-methyl-benzyl)-amino]-sydnonimine hydrochloride and nicotinoyl chloride.

EXAMPLE 7

Using the procedure of Step B of Example 2, 32% of the theoretical yield of 3-piperidino-N⁶-ethoxycarbonyl-sydnonimine hydrochloride, having a melting point of 139–141° C. (decomp.), was obtained from 3-piperidino-sydnonimine hydrochloride and ethyl chloroformate.

EXAMPLE 8

Using the procedure of Step B of Example 2, 47% of the theoretical yield of 3-diallylamino-4-ethyl-N⁶-ethoxycarbonyl-sydnonimine hydrochloride, having a melting point of 95–96° C. (decomp.), of the formula

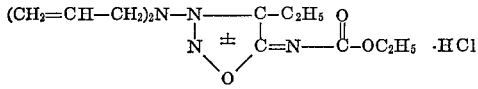

was obtained from 3-diallylamino-4-ethyl-sydnonimine hydrochloride and ethyl chloroformate.

EXAMPLE 9

Using the procedure of Step B of Example 2, 54% of the theoretical yield of 3-dimethylamino-N⁶-acetyl-sydnonimine hydrochloride, having a melting point of 174° C. (decomp.), was obtained from 3-dimethylamino-sydnonimine hydrochloride and acetic acid anhydride.

EXAMPLE 10

Using the procedure of Step B of Example 1, 31% of the theoretical yield of 3-piperidino-N⁶-acetyl-sydnonimine methoiodide, having a melting point of 96–97° C. (decomp.), was obtained from 3-piperidino-sydnonimine methoiodide and acetic acid anhydride.

EXAMPLE 11

Using the procedure of Step B of Example 2, 60% of the theoretical yield of 3-dimethylamino-N⁶-benzoyl-sydnonimine hydrochloride, having a melting point of 178° C. (decomp.), was obtained from 3-dimethylamino-sydnonimine hydrochloride and benzoyl chloride.

EXAMPLE 12

Using the procedure of Step B of Example 2, 59% of the theoretical yield of 3-dimethylamino-N⁶-cyclohexyl-carbonyl-sydnonimine hydrochloride, having a melting point of 187° C. (decomp.), of the formula

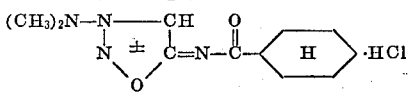

was obtained from 3-dimethylamino-sydnonimine hydrochloride and cyclohexylcarbonyl chloride.

EXAMPLE 13

Using the procedure of Step B of Example 2, 57% of the theoretical yield of 3-dimethylamino-N⁶-nicotinoyl-sydnonimine hydrochloride, having a melting point of 198–199° C. (decomp.), was obtained from 3-dimethylamino-sydnonimine hydrochloride and nicotinoyl chloride.

EXAMPLE 14

Using the procedure of Step A of Example 1, 67% of the theoretical yield of 3-morpholino-sydnonimine hydrochloride, having a melting point of 180° C. (decomposition), was obtained from N-amino-morpholine.

Using the procedure of Step B of Example 1, 61% of the theoretical yield of 3-morpholino-N⁶-cyclohexylcarbonyl-sydnonimine hydrochloride, having a melting point of 187° C. (decomp.), was obtained from 3-morpholino-sydnonimine hydrochloride and cyclohexylcarbonyl chloride.

EXAMPLE 15

Preparation of 3-dimethylamino-4-bromo-sydnonimine hydrobromide 55 gm. of N⁶-acetyl-3-dimethylamino-sydnonimine hydrochloride were suspended in a mixture of 100 cc. of chloroform and 1500 cc. of ether in the presence of 120 gm. of sodium bicarbonate. Thereafter, while refluxing and stirring the suspension, 20 cc. of bromine were added dropwise thereto over a period of two hours, and then the resulting reaction mixture was refluxed for three hours more. Subsequently, the insoluble matter was filtered off, and the filtrate was evaporated in vacuo. The resinous residue was crystallized and recrystallized from ethanol-petroleum ether, yielding 48 gm. (67% of theory) of 3-dimethylamino-4-bromo-sydnonimine hydrobromide, m.p. 159° C. (decomp.), of the formula

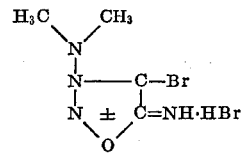

EXAMPLE 16

Preparation of N⁶-acetyl-4-bromo-3(1′-piperidino)-sydnonimine hydrobromide 30 gm. of N⁶-acetyl-3-(1′-piperidino)-sydnonimine hydrochloride were suspended in 1000 ml. of ether in the presence of 48 gm. of sodium acetate. While refluxing and stirring the suspension, 48 gm. of bromine dissolved in 75 ml. of chloroform were added dropwise over a period of two hours. The mixture was refluxed for six hours more, and was then allowed to stand at room temperature overnight. The solvent was removed in vacuo, the residue was distributed between water and chloroform, and the chloroform extracts were combined, dried over sodium sulfate and evaporated in vacuo. The residue was dissolved in acetone, and hydrogen bromide was added while cooling with ice. Upon addition of ether, crystals separated out which were recrystallized from methanol/ether. 27.5 gm. (61% of theory) of $N^6$-acetyl-4-bromo-3-(1'-piperidino)-sydnonimine hydrobromide, m.p. 98° C. (decomp.), of the formula

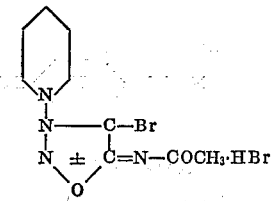

were obtained.

EXAMPLE 17

Preparation of 4-bromo-3(1'-piperidino)-sydnonimine hydrobromide 22 gm. of $N^6$-acetyl-4-bromo-3(1'-piperidino)-sydnonimine hydrobromide were dissolved in 400 ml. of 1N hydrochloric acid, and the solution was allowed to stand at room temperature for three days. The acidic solution was extracted with ether, and the ether extract solution was discarded. The aqueous phase was neutralized with a saturated aqueous sodium bicarbonate solution and repeatedly extracted with chloroform. The combined chloroform extracts were dried over sodium sulfate and evaporated in vacuo. The residue was dissolved in isopropanol, and hydrogen bromide was added to the solution while cooling with ice. Upon addition of ether, crystals separated out which were recrystallized from isopropanol/ether. 13 gm. (67% of theory) of 4-bromo-3-(1'-piperidino)-sydnonimine hydrobromide, m.p. 140° C. (decomp.), were obtained.

EXAMPLE 18

Preparation of $N^6$-acetyl-3-(1',2',3',4'-tetrahydroisoquinolino)-sydnonimine hydrochloride (a) 25.3 gm. of 3-(1',2',3',4'-tetrahydroisoquinolino)-sydnonimine hydrochloride were added in portions to a mixture of 200 ml. of pyridine and 200 ml. of acetic acid anhydride at room temperature. The mixture was stirred overnight at room temperature. The pyridine and acetic acid anhydride were removed in vacuo. The residue crystallized upon addition of ether. The crystals were recrystallized from acetone/ether. Yield: 29.5 gm. (87% of theory) of $N^6$-acetyl-3-(1',2',3',4'-tetrahydroisoquinoline)-sydnonimine hydrochloride.

EXAMPLE 19

Preparation of 4-bromo-$N^6$-cyclohexylcarbonyl-3-morpholino-sydnonimine hydrochloride 47.5 gm. of $N_6$-cyclohexylcarbonyl-3-morpholino-sydnonimine hydrochloride were suspended in 600 ml. of ether in the presence of 32 gm. of sodium acetate. While refluxing and stirring the suspension, 45 gm. of bromine in 75 ml. of chloroform were added dropwise over a period of two hours. The mixture was refluxed for four hours more and was then allowed to stand at room temperature for three days. The solvent was removed in vacuo, the residue was distributed between water and chloroform, and the chloroform extracts were combined, dried over sodium sulfate and evaporated to dryness in vacuo. The resinous residue was dissolved in methanol, and hydrogen chloride was introduced into the solution while cooling with ice. Upon addition of ether, crystals separated out which were recrystallized from methanol/ether. 44 gm. (74% of theory) of 4-bromo-$N^6$-cyclohexylcarbonyl-3-morpholino-sydnonimine hydrochloride, m.p. 150° C. (decomp.) of the formula

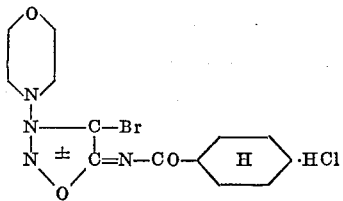

were obtained.

EXAMPLE 20

Preparation of 4-bromo-3-morpholino-sydnonimine hydrobromide 26 gm. of 4-bromo-$N^6$-cyclohexylcarbonyl-3-morpholino-sydnonimine hydrochloride were dissolved in 400 ml. of 1N hydrochloric acid, and the solution was allowed to stand at room temperature for three days. The acidic solution was extracted with ether, and the ether extracts were discarded. The aqueous phase was neutralized with saturated aqueous sodium bicarbonate and then repeatedly extracted with chloroform. The combined chloroform extracts were dried over sodium sulfate and evaporated in vacuo. The residue was dissolved in methanol, and hydrogen bromide was introduced into the solution while cooling with ice. Upon addition of ether, crystals separated out which were recrystallized from methanol/ether. 7.6 gm. (35% of theory) of 4-bromo-3-morpholino-sydnonimine hydrobromide, m.p. 170° C. (decomp.), were obtained.

EXAMPLE 21

Preparation of 4-bromo-$N^6$-cyclohexylcarbonyl-3-morpholino-sydnonimine hydrochloride 10 gm. of $N^6$-cyclohexylcarbonyl-3-morpholino-sydnonimine were suspended in 75 ml. of carbon tetrachloride, and, while stirring the solution, 17.8 gm. of N-bromosuccinimide were added in small portions at room temperature. After the addition was complete, the formed precipitate was filtered off and washed with carbon tetrachloride. The filtrate was evaporated to dryness in vacuo, the residue was dissolved in a small amount of methanol, and the solution was acidified with ethereal hydrogen chloride. Upon further addition of ether, crystals separated out which were recrystallized from methanol/ether, yielding 12 gm. (85% of theory) of 4-bromo-$N^6$-cyclohexylcarbonyl-3-morpholino-sydnonimine hydrochloride, m.p. 150° C.

EXAMPLE 22

Preparation of 4-bromo-$N^6$-ethoxycarbonyl-3-piperidino-sydnonimine hydrochloride 24.0 gm. of $N^6$-ethoxycarbonyl-3-piperidino-sydnonimine were suspended in 500 ml. of carbon tetrachloride, and 53.4 gm. of N-bromo-succinimide were added to the suspension in small portions. The mixture was allowed to stand at room temperature for three hours. The solids were removed by filtration and washed with carbon tetrachloride. The filtrate and washings were combined and evaporated to dryness in vacuo. The residue was dissolved in ethanol, and the solution was acidified with ethereal hydrogen chloride. The crystals which separated out were recrystallized from ethanol/ether, yielding 19.3 gm. (54% of theory) of 4-bromo-$N^6$-etthoxycarbonyl-3-piperidino-sydnonimine hydrochloride, m.p. 137° C. (decomp.), of the formula

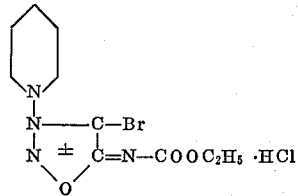

EXAMPLE 23

Preparation of 4-chloro-N⁶-cyclohexylcarbonyl-3-morpholino-sydnonimine hydrochloride 34 gm. of N⁶-cyclohexylcarbonyl-3-morpholino-sydnonimine were suspended in 175 ml. of warm carbon tetrachloride, and 33.2 gm. of N-chloro-succinimide were added to the suspension in portions, followed by 0.4 gm. of benzoyl peroxide. The mixture was refluxed for 15 minutes, then cooled on an ice bath, and the solids were removed by filtration. The filtrate was evaporated to dryness in vacuo, the residue was dissolved in a small amount of methanol, and the solution was acidified with ethereal hydrogen chloride. The crystals which separated out were recrystallized from methanol/ether. 28.9 gm. (68% of theory) of 4-chloro-N⁶-cyclohexylcarbonyl-3-morpholino-sydnonimine hydrochloride, m.p. 135° C. (decomp.), of the formula

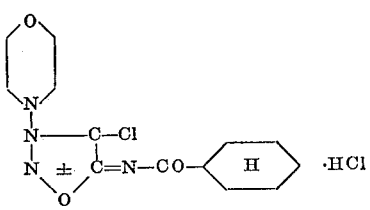

were obtained.

EXAMPLE 24

Preparation of 4-chloro-3-morpholino-sydnonimine hydrochloride 44 gm. of 4-chloro-N⁶-cyclohexylcarbonyl-3-morpholino-sydnonimine hydrochloride were dissolved in 175 ml. of aqueous 2N hydrochloric acid, and the solution was allowed to stand at room temperature for three days. Thereafter, it was repeatedly extracted with ether, and the ether extracts were discarded. The aqueous phase was neutralized and extracted several times with chloroform. The combined chloroform extracts were evaporated to dryness in vacuo, the residue was dissolved in a small amount of methanol, the solution was acidified with ethereal hydrochloric acid, and the precipitate was recrystallized from methanol/ether. 16.1 gm. (53% of theory) of 4-chloro-3-morpholino - sydnonimine hydrochloride, m.p. 163° C. (decomp.), were obtained.

EXAMPLE 25

Preparation of 4-chloro-N⁶-ethoxycarbonyl-3-piperidino-sydnonimine hydrochloride 48 gm. of N⁶-ethoxycarbonyl-3-piperidino-sydnonimine were suspended in 1000 ml. of warm carbon tetrachloride. 53.4 gm. of N-chloro-succinimide were added to the suspension in small portions, followed by 1.2 gm. of benzoyl peroxide. The mixture was refluxed for 15 minutes, then cooled on an ice bath, and the solids were removed by filtration. The filtrate was evaporated to dryness i.e., the residue was dissolved in a small amount of ethanol, and the solution was acidified with ethereal hydrochloric acid. The crystals which separated out were recrystallized from ethanol/ether, yielding 14.9 gm. (48% of theory) of 4-chloro-N⁶-ethoxycarbonyl-3-piperidino-sydnonimine hydrochloride, m.p. 131° C. (decomp.).

EXAMPLE 26

Preparation of N⁶-cyclohexylcarbonyl-4-iodo-3-morpholino-sydnonimine hydrochloride 14 gm. of N⁶-cyclohexylcarbonyl-3-morpholino-sydnonimine were suspended in 100 ml. of carbon tetrachloride. 19.5 gm. of N-iodo-succinimide were added to the suspension, followed by 0.5 gm. of benzoyl peroxide. The mixture was refluxed for 1 hour. After cooling, the precipitate was filtered off and washed several times with carbon tetrachloride. The filtrate and washings were combined and evaporated to dryness in vacuo. The residue was dissolved in small amount of methanol, and the solution was acidified with ethereal hydrochloric acid. The crystals formed thereby were collected and recrystallized from methanol/ether. 10.8 gm. (49% of theory) of N⁶-cyclohexylcarbonyl-4-iodo-3-morpholino-sydnonimine hydrochloride, m.p. 158–160° C. (decomp.) of the formula

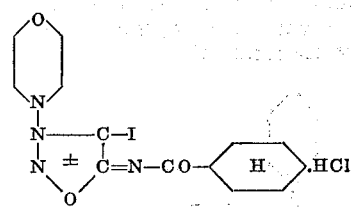

were obtained.

EXAMPLE 27

N⁶-ethoxycarbonyl-4-chloro-3-morpholino-sydnonimine 26.6 gm. of N-chloro-succinimide were added to a suspension of 24.2 gm. of N⁶-ethoxycarbonyl-3-morpholino-sydnonimine in 200 ml. of carbon tetrachloride, the mixture was heated to 50° C., and then 0.4 gm. of benzoyl peroxide was added. After the reaction had gone to completion, the reaction mixture was cooled on an ice bath, and the precipitate formed thereby was collected by filtration and recrystallized from methanol. 12.2 gm. (43% of theory) of N⁶-ethoxycarbonyl-4-chloro-3-morpholino-sydnonimine, m.p. 165° C. (decomp.), of the formula

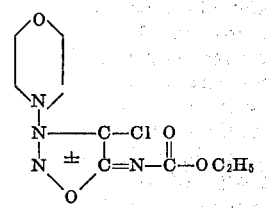

were obtained.

EXAMPLE 28

N⁶-ethoxycarbonyl-4-bromo-3-morpholino-sydnonimine and its hydrochloride 32 gm. of N-bromo-succinimide were added in small portions to a suspension of 25 gm. of N⁶-ethoxycarbonyl-3-morpholino-sydnonimine in 200 ml. of carbon tetrachloride. The mixture was heated to 50° C. and maintained at that temperature for ten minutes, subsequently cooled on an ice bath, and the crystalline precipitate formed thereby was collected in a centrifuge and recrystallized from methanol/ether. 22.5 gm. (68% of theory) of N⁶-ethoxycarbonyl-4-bromo - 3 - morpholino-sydnonimine, m.p. 168° C. (decomp.), were obtained.

The free base thus obtained was dissolved in methanol, the solution was acidified with ethereal hydrochloric acid, and the precipitate formed thereby was collected and recrystallized from methanol/ether, yielding the hydrochloride, m.p. 124° C. (decomp.), of the formula

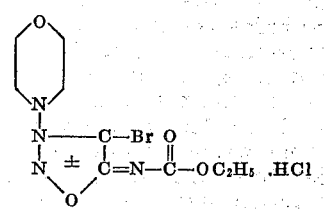

EXAMPLE 29

N⁶-ethoxycarbonyl-4-iodo-3-morpholino-sydnonimine 25 gm. of N-iodo-succinimide and then 1 gm. of benzoyl peroxide were added to a suspension of 17.8 gm. of N⁶-ethoxycarbonyl-3-morpholino-sydnonimine in 200 ml. of carbon tetrachloride, and the mixture was refluxed for four hours and then cooled to +10° C. The crystalline precipitate formed thereby was collected by filtration and recrystallized from methanol/ether. 19.5 gm. (68% of theory) of N⁶-ethoxycarbonyl-4-iodo-3-morpholino-sydnonimine, m.p. 165° C. (decomp.).

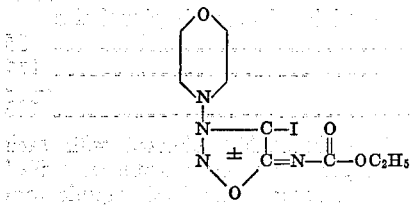

were obtained.

EXAMPLE 30

N⁶-phenyloxycarbonyl-3-(N'-methyl-piperazino)-sydnonimine and its hydrochloride 40 gm. of 3-(N'-methyl-piperazino)-sydnonimine hydrochloride were dissolved in 400 ml. of dry pyridine, the solution was cooled to +10° C., and at that temperature 48 gm. of phenyl chloroformate were added dropwise. The mixture was allowed to stand overnight at room temperature and was then worked up in conventional fashion to isolate the reaction product, N⁶-phenyloxycarbonyl-3-(N'-methyl-piperazino)-sydnonimine. The free base product was dissolved in acetone, and the solution was acidified with ethereal hydrochloric acid, yielding 31.4 gm. (66% of theory) of the hydrochloride, m.p. 154–157° C. (decomp.).

The hydrochloride was dissolved in 100 ml. of water, the solution was admixed with an excess of aqueous sodium bicarbonate solution, the mixture was extracted with chloroform, and the extract was worked up, yielding 24.2 gm. of the free base.

EXAMPLE 31

Preparation of N⁶-phenyloxycarbonyl-4-bromo-3-(N'-methyl-piperazino)-sydnonimine hydrobromide 6 gm. of N⁶-phenyloxycarbonyl-3-(N'-methyl-piperazino)-sydnonimine were suspended in 200 ml. of carbon tetrachloride, the suspension was cooled to +10° C., and at that temperature 7.1 gm. of N-bromo-succinimide were added thereto. The resulting mixture was stirred for three hours at room temperature, then heated to 50° C. and allowed to stand at this temperature for thirty minutes. Thereafter, the reaction mixture was worked up in conventional fashion, the residual resinous product, N⁶-phenyloxycarbonyl-4-bromo-3-(N'-methyl-piperazino)-sydnonimine, was dissolved in methanol, and the solution was acidified with ethereal hydrobromic acid. The precipitate formed thereby was collected and recrystallized from methanol/ether, yielding 8.0 gm. (63% of theory) of N⁶-phenyloxycarbonyl-4-bromo-3-(N'-methyl-piperazino)-sydnonimine hydrobromide, m.p. 106–108° C. (decomp.), of the empirical formula $C_{14}H_{16}BrN_5O_3 \cdot 2$ HBr·H₂O and the probable structural formula

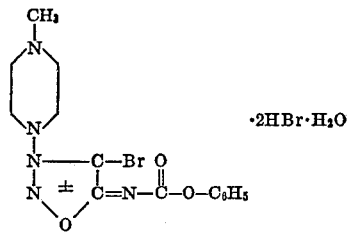

The compounds according to the present invention, that is, the compounds embraced by formula I above and their non-toxic, pharmacologically acceptable acid addition salts, have useful pharmacodynamic properties. More particularly, they exhibit unusually long-lasting hypotensive activities in warm-blooded animals, such as dogs and cats, at low dosage levels, as determined by in vivo tests on anesthetized animals. In comparison to the structurally related known hypotensive compound, 3-benzyl-sydnonimine (British Pat. No. 962,293), the hypotensive action of the compounds according to the present invention sets in less abruptly and is of significantly longer duration.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective dosage unit of the compounds according to the present invention is from 0.166 to 1.67 mgm./kg. body weight.

The following examples illustrate a few dosage unit compositions comprising a compound of the instant invention as an active ingredient and represent the best mode contemplated of putting the invention to practical use. The parts are parts by weight unless otherwise specified.

EXAMPLE 32

Coated pills

The pill core composition was compounded from the following ingredients:

|  | Parts |
|---|---|
| N⁶-Cyclohexylcarbonyl-3-morpholinosydnonimine hydrochloride | 50 |
| Lactose | 65 |
| Corn starch | 90 |
| Sec. calcium phosphate | 35 |
| Soluble starch | 3 |
| Magnesium stearate | 3 |
| Colloidal silicic acid | 4 |
| Total | 250 |

The ingredients were admixed with each other in customary fashion, and the mixture was compressed into 250 mgm.-pill cores, which were subsequently coated with a thin shell consisting essentially of talcum and sugar. Each coated pill contained 50 mgm. of the sydnonimine salt and, when administered perorally to a warm-blooded animal of about 60 kg. body weight in need of such treatment, produced very good and long-lasting hypotensive effects.

Analogous results were obtained with coated pills compounded from the following ingredients:

|  | Parts |
|---|---|
| N⁶-Ethoxycarbonyl-4-bromo-3-morpholinosydnonimine hydrochloride | 30 |
| Lactose | 55 |
| Corn starch | 75 |
| Sec. calcium phosphate | 30 |
| Soluble starch | 3 |
| Magnesium stearate | 3 |
| Colloidal silicic acid | 4 |
| Total | 200 |

EXAMPLE 33

Drop solution

The solution was compounded from the following ingredients:

4-Bromo-N⁶-ethoxycarbonyl-3-morpholinosydnonimine hydrochloride: 2.00 parts
Methyl-p-hydroxybenzoate: 0.07 parts
Ethyl p-hydroxybenzoate: 0.03 parts
Ethanol 96%: 20 parts by vol.
Demineralized water, q.s.ad 100 parts by vol.

The ingredients were dissolved in the demineralized water, and the solution was filtered until clear. 1 cc. (20 drops) of the solution contained 20 mgm. of the sydnonimine salt and, when administered perorally to a warm-blooded animal of about 60 kg. body weight in need of such treatment, produced very good and long-lasting hypotensive effects.

EXAMPLE 34

Hypodermic solution

The solution was compounded from the following ingredients:

$N^6$-Acetyl - 3 - piperidino-sydnonimine hydrochloride: 2.0 parts
Sodium chloride: 1.8 parts
Distilled water, q.s.ad 200 parts by vol.

The ingredients were dissolved in the distilled water, the solution was filtered until free from suspended particles, and the filtrate was filled into 2 cc.-ampules under aseptic conditions. The filled ampules were then sealed and sterilized for 20 minutes at 120°C. Each ampule contained 20 mgm. of the sydnonimine salt, and when the contents thereof were administered intravenously to a warm-blooded animal of about 60 kg. body weight in need of such treatment, very good and long-lasting hypotensive effects were obtained.

EXAMPLE 35

Tablets

The tablet composition was compounded from the following ingredients:

| | Parts |
|---|---|
| 3 - Dimethylamino-$N^6$-(5'-nitro-furoyl)-sydnonimine hydrochloride | 35 |
| Lactose | 60 |
| Corn starch | 35 |
| Soluble starch | 4 |
| Magnesium stearate | 1 |
| Total | 135 |

The sydonoimine salt, the lactose and the corn starch were intimately admixed with each other, and the resulting mixture was granulated by moistening it with an aqueous 20% solution of the soluble starch and passing the moistened mass through a 1 mm.-mesh screen. The moist granulate was dried at 40° C. and was again forced through the screen. The magnesium stearate was blended into the granulate, and the resulting mixture was pressed into 135 mgm.-tablets. Each tablet contained 35 mgm. of the sydnonimine salt and, when perorally administered to a warm-blooded animal of about 60 kg. body weight in need of such treatment, produced a very effective hypotensive action.

EXAMPLE 36

Gelatin capsules

The capsule filler composition was compounded from the following ingredients:

| | Parts |
|---|---|
| 3 - Morpholino-$N^6$-cyclohexylcarbonyl-sydonoimine hydrochloride | 25 |
| Corn starch | 175 |
| Total | 200 |

The ingredients were thoroughly admixed with each other, and 200 mgm.-portions of the mixture were filled into gelatin capsules of suitable size. Each capsule contained 2 mgm. of sydnonimine salt and, when perorally administered to a warm-blooded animal of about 60 kg. body weight, produced a very effective hypotensive action.

Analogous results were obtained when an equal amount of any one of the other sydnonimine compounds embraced by formula I above or a non-toxic acid addition salt thereof was substituted for the particular sydnonimine salt in Examples 32 to 36. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. 3 - morpholino-$N^6$-cyclohexylcarbonyl-sydnonimine or a non-toxic, pharmacologically acceptable acid addition salt thereof.

References Cited

UNITED STATES PATENTS

| 3,769,283 | 10/1973 | Masuda et al. | 260—247.2 A |
| 3,277,108 | 10/1966 | Daeniker | 260—307 |
| 3,312,690 | 4/1967 | Masuda et al. | 260—239 |

OTHER REFERENCES

Masuda et al.: Chemical Abstracts, vol. 73, p. 25488 (1970).

DONALD G. DAUS, Primary Examiner

J. TOVAR, Assistant Examiner

U.S. Cl. X.R.

260—247.5 R, 268 N, 287 R, 293.67, 295 AM, 295.5 A, 307 F, 268 CN; 424—248

UNITED STATES PATENT AND TRADEMARK OFFICE
Certificate

Patent No. 3,833,580                                Patented September 3, 1974

Manfred Gotz, Karl Zeile, Kurt Freter and Gisela Wehlmann

Application having been made by Manfred Gotz, Karl Zeile, Kurt Freter and Gisela Wehlmann, the inventors named in the patent above identified and Boehringer Ingelheim G.m.b.H., Ingelheim am Rhine, Germany, the assignee, for the issuance of a certificate under the provisions of Title 35, Section 256, of the United States Code, deleting the name of Gisela Wehlmann as a joint inventor, and a showing and proof of facts satisfying the requirements of the said section having been submitted, it is this 1st day of February 1977, certified that the name of the said Gisela Wehlmann is hereby deleted to the said patent as a joint inventor with the said Manfred Gotz, Karl Zeile and Kurt Freter.

FRED W. SHERLING,
*Associate Solicitor.*